United States Patent
Molleti et al.

(10) Patent No.: US 9,009,322 B1
(45) Date of Patent: Apr. 14, 2015

(54) METHOD AND APPARATUS FOR LOAD BALANCING BETWEEN WAN OPTIMIZATION DEVICES

(75) Inventors: Powell Molleti, Mountain View, CA (US); Ekanth Sethuramalingam, Milpitas, CA (US); Adityashankar Kini, San Carlos, CA (US); John Milford, Champaign, IL (US)

(73) Assignee: Riverbed Technology, Inc., San Francisco, CA (US)

( * ) Notice: Subject to any disclaimer, the term of this patent is extended or adjusted under 35 U.S.C. 154(b) by 262 days.

(21) Appl. No.: 13/536,770

(22) Filed: Jun. 28, 2012

Related U.S. Application Data

(60) Provisional application No. 61/503,487, filed on Jun. 30, 2011.

(51) Int. Cl.
*G06F 15/173* (2006.01)
*H04L 12/927* (2013.01)

(52) U.S. Cl.
CPC .................................. *H04L 47/801* (2013.01)

(58) Field of Classification Search
None
See application file for complete search history.

(56) References Cited

U.S. PATENT DOCUMENTS

| | | | |
|---|---|---|---|
| 7,873,060 B2 * | 1/2011 | Luo et al. | 370/401 |
| 8,682,916 B2 * | 3/2014 | Wong et al. | 707/758 |
| 2008/0281908 A1 * | 11/2008 | McCanne et al. | 709/203 |
| 2009/0092137 A1 * | 4/2009 | Haigh et al. | 370/392 |
| 2009/0094252 A1 * | 4/2009 | Wong et al. | 707/10 |
| 2009/0210427 A1 * | 8/2009 | Eidler et al. | 707/10 |
| 2010/0098092 A1 * | 4/2010 | Luo et al. | 370/401 |
| 2010/0115604 A1 * | 5/2010 | Gerber et al. | 726/15 |
| 2010/0146074 A1 * | 6/2010 | Srinivasan | 709/218 |

* cited by examiner

*Primary Examiner* — Ninos Donabed
(74) *Attorney, Agent, or Firm* — Park, Vaughan, Fleming & Dowler LLP; Laxman Sahasrabuddhe

(57) ABSTRACT

Systems and techniques are described for load balancing between WAN optimization devices. During operation, a mapping is determined based solely or partially on capacities of a set of remote WAN optimization devices and capacities of a set of local WAN optimization devices, wherein the mapping maps each remote WAN optimization device to a local WAN optimization device. Next, connection requests are directed to WAN optimization devices based on the mapping.

26 Claims, 6 Drawing Sheets

METHOD AND APPARATUS FOR LOAD BALANCING BETWEEN WAN OPTIMIZATION DEVICES

RELATED APPLICATION

This application claims priority to U.S. Provisional Application No. 61/503,487, entitled "Load distribution," by inventors Powell Molleti, Ekanth Sethuramalingam, and Adityashankar Kini, filed 30 Jun. 2011, the contents of which are herein incorporated by reference.

BACKGROUND

1. Technical Field

This disclosure relates to computer networking. More specifically, this disclosure relates to methods and apparatuses for load balancing between wide-area network (WAN) optimization devices.

2. Related Art

The enterprise network has become a critical part of an organization's information technology infrastructure. Enterprise networks often include a WAN that interconnects offices that are distributed over a large geographical area. Many enterprise networks include one or more data centers that host computers to provide critical services (e.g., email, file sharing, etc.) throughout the organization. Improving performance of the enterprise network is important because it improves productivity, which in turn increases profitability.

Some enterprise networks use WAN optimization devices to improve network performance. WAN optimization devices optimize network traffic to improve WAN performance in reading and/or writing data over a network. Some WAN optimization devices monitor users' network traffic to attempt to predict data likely to be requested by users. This predicted data is prefetched over the WAN and cached by the WAN optimization devices at the users' respective network locations, so that this data can be quickly accessed by users if requested. WAN optimization devices also typically compress data (e.g., by performing de-duplication) for communication over the WAN. The WAN optimization devices' prefetching, caching, and compression masks the bandwidth and latency limitations of WANs from users.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Additionally, techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

SUMMARY

Some embodiments provide systems and techniques for load balancing between a set of local WAN optimization devices. Each WAN optimization device is associated with a capacity which is indicative of the amount of load (e.g., network connections) that the WAN optimization device is designed to handle. The capacity can be pre-configured (e.g., stored in a configuration file on the WAN optimization device) or be determined based on network statistics. The capacity of a WAN optimization device can be specified at an arbitrarily level of granularity, e.g., at a per WAN optimization device level, at a per-application level, etc.

In some embodiments, connection requests from a set of remote WAN optimization devices to a set of local WAN optimization devices pass through a load balancer. In these embodiments, the load balancer can determine a mapping from the set of remote WAN optimization devices to the set of local WAN optimization devices based on the capacities of the set of remote WAN optimization devices and the set of local WAN optimization devices. In this disclosure, the term "based on" means "based solely or partially on."

The load balancer can use other information (i.e., in addition to the WAN optimization device capacities) to determine the mapping. For example, the load balancer can determine the mapping by additionally using the amount of state information that is shared between pairs of remote and local WAN optimization devices (e.g., the mapping that maximizes the amount of state information that is shared between WAN optimization devices may be preferred), the current load on the local WAN optimization devices, and/or any other factor that is helpful in balancing the load across multiple WAN optimization devices. Once the mapping is determined, the load balancer can then direct connection requests from the set of remote WAN optimization devices to the set of local WAN optimization devices based on the mapping.

The load balancer can also direct connection requests from the set of local WAN optimization devices to the set of remote WAN optimization devices based on the mapping. Additionally, the load balancer can direct connection requests from local computers to the set of local WAN optimization devices based on the mapping and based on the observed connection patterns between local computers and remote computers.

In some embodiments, the mapping is automatically updated based on continually measuring the load on the local and/or remote WAN optimization devices and/or based on network statistics. Specifically, in some embodiments, if the load balancer determines that one or more local WAN optimization devices are overloaded, the load balancer can artificially decrease the capacities of the overloaded local WAN optimization device(s), and determine a potentially different mapping based on the updated capacities. Once the load balancer detects that the load(s) of the overloaded local WAN optimization device(s) have returned to acceptable levels, the load balancer can increase the capacity of the overloaded local WAN optimization device(s), and optionally remap the WAN optimization devices based on the updated capacities.

DETAILED DESCRIPTION

Figure 1:
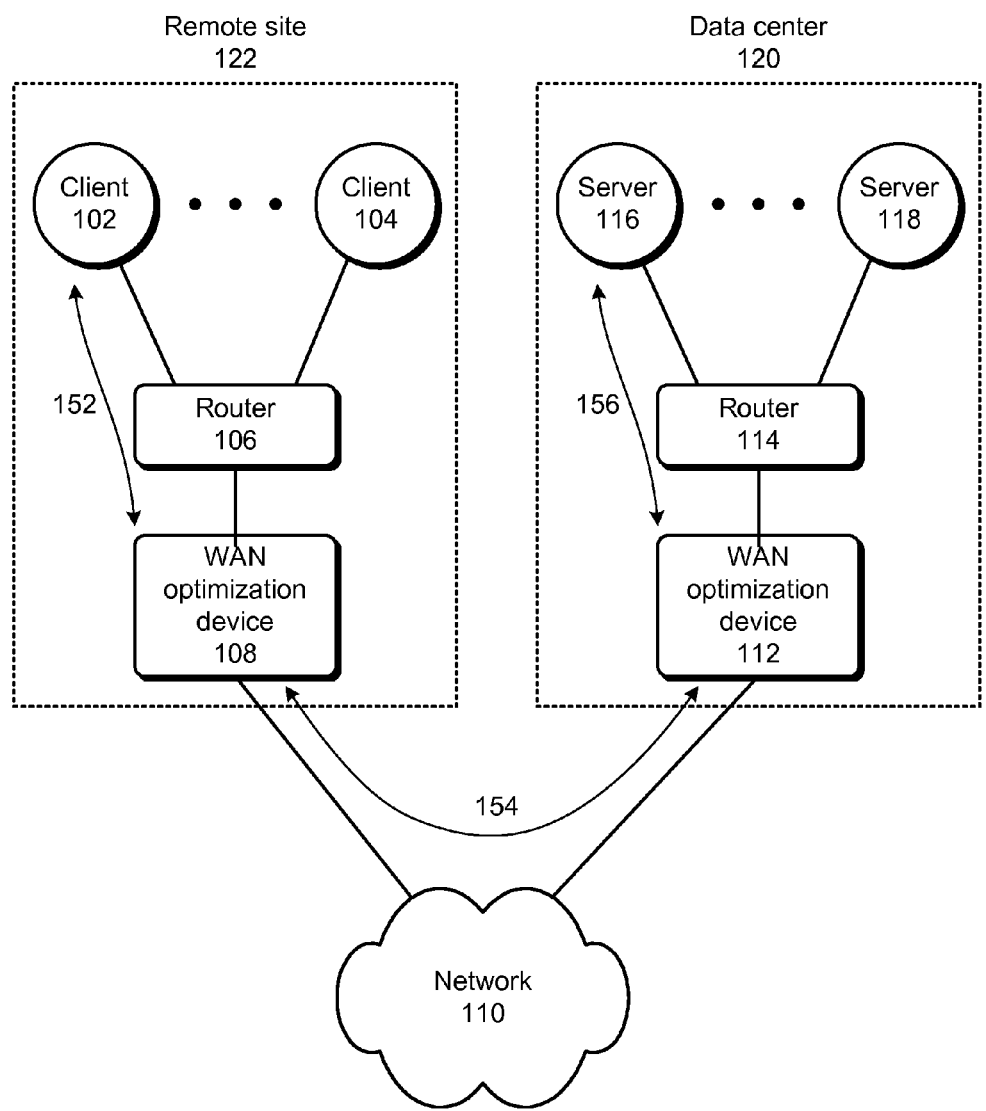
FIG. 1 illustrates an example of how a pair of WAN optimization devices can improve network performance in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

A computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

A network is an interconnection of one or more devices that is capable of delivering information from one computer to another computer. Examples of networks include, but are not limited to, wireless and wired networks, local area networks (LANs), metropolitan area networks (MANs), WANs, private networks, public networks, intranets, internets, etc.

A load balancer is a device that balances the load across two or more WAN optimization devices. In some embodiments, the load balancer transparently intercepts connection requests, and directs the intercepted connection requests in a manner that balances the load across the set of WAN optimization devices. An intercepted connection request can be from a remote WAN optimization device, from a local WAN optimization device, or from a local computer (e.g., from a server in the same data center that includes the load balancer).

Some WAN optimization devices may include information in the connection request that may only be understood by other WAN optimization devices. For example, some WAN optimization devices may use a proprietary set of transport control protocol (TCP) options to specify and/or negotiate optimization options (e.g., the compression technique that is to be used for WAN optimization) with their peers. In some embodiments, the load balancer understands such information (e.g., the TCP options) that is included in the connection request, and may use the information to direct the connection request. For example, if the connection request specifies that a particular compression technique is to be used, and if that compression technique is supported by only a subset of the WAN optimization devices, then the load balancer can direct the connection request to a WAN optimization device in that subset.

Network Architecture

FIG. 1 illustrates an example of how a pair of WAN optimization devices can improve network performance in accordance with some embodiments described herein. Although this disclosure describes systems and techniques primarily in the context of a WAN, the disclosed systems and techniques can generally be used to improve performance of any type of network.

Remote site 122 can be a company's headquarters or a company's regional office. Data center 120 can host servers and data storage systems for the company's enterprise network. Remote site 122 includes one or more clients 102-104, router 106, and WAN optimization device 108. Data center 120 includes one or more servers 116-118, router 114, and WAN optimization device 112. WAN optimization device 108 communicates with WAN optimization device 112 over network 110, which is usually a wide area network.

WAN optimization device 108 establishes connection 154 with WAN optimization device 112, and then uses connection 154 to optimize at least some communications between clients 102-104 and servers 116-118. For example, WAN optimization devices 108 and 112 can intercept a connection between client 102 and server 116 and establish the following two connections: connection 152 between client 102 and WAN optimization device 108, and connection 156 between server 116 and WAN optimization device 112. The interception may be performed transparently, i.e., client 102 and server 116 may communicate with each other as if they had established an end-to-end connection without realizing that, in fact, the end-to-end connection was split into multiple connections by WAN optimization devices 108 and 112.

WAN optimization devices 108 and 112 can then use connections 152, 154, and 156 to optimize communications between client 102 and server 116. For example, data sent by client 102 to server 116 can be received at WAN optimization device 108. Next, WAN optimization device 108 can transform the data (e.g., by performing de-duplication) and send the transformed data to WAN optimization device 112 over connection 154. The transformation can significantly reduce the size of the data, thereby reducing the amount of bandwidth required to communicate the data over connection 154. WAN optimization device 112 can then perform an inverse transformation to recover the original data. The recovered original data can then be sent from WAN optimization device 112 to server 116. Likewise, in the return path (i.e., when server 116 sends data to client 102), data can be transformed by WAN optimization device 112 and the original data can be subsequently recovered by WAN optimization device 108.

Figure 2:
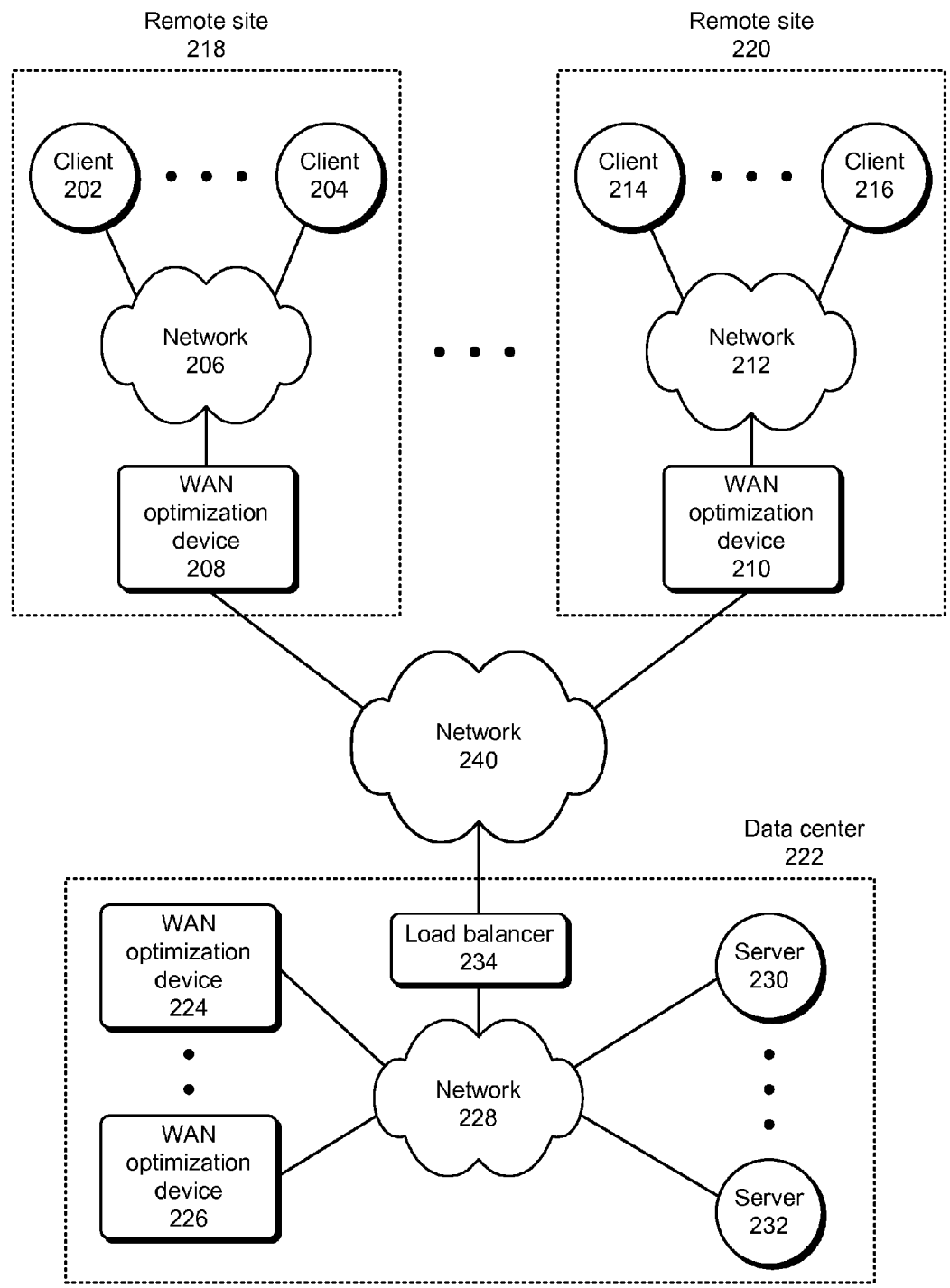
FIG. 2 illustrates a network architecture that includes a load balancer to perform load balancing between multiple WAN optimization devices in accordance with some embodiments described herein.

FIG. 2 illustrates a network architecture that includes a load balancer to perform load balancing between multiple WAN optimization devices in accordance with some embodiments described herein.

According to one definition, a load balancer is device that is capable of directing connection requests to a set of WAN optimization devices so as to balance the load between the set of WAN optimization devices.

The enterprise network shown in FIG. 2 includes multiple remote sites (e.g., remote sites 218 and 220) and a data center (e.g., data center 222). Each remote site can include one or more clients (e.g., clients 202-204 and 214-216), one or more networks (e.g., networks 206 and 212), and one or more WAN optimization devices (e.g., WAN optimization devices 208 and 210). Data center 222 can host servers and data storage systems for the company's network. Specifically, data center 222 includes one or more servers 230-232, and multiple WAN optimization devices 224-226. The devices in data center 222 can communicate with one another over network 228. The WAN optimization devices at the remote sites (e.g., WAN optimization devices 208 and 210) communicate with devices in the data center 222 over network 240.

During operation, a WAN optimization device in a remote site (e.g., WAN optimization device 208 in remote site 218) establishes a connection with a WAN optimization device in the data center (e.g., WAN optimization device 224 in data center 222). The pair of WAN optimization devices then optimizes communications between computers in the remote site and computers in the data center.

Some embodiments described herein provide one or more load balancers (e.g., load balancer 234) that perform load balancing between the WAN optimization devices (e.g., WAN optimization devices 224-226).

For example, in some embodiments, all communications between WAN optimization devices 208-210 at remote sites 218-220 and WAN optimization devices 224-226 at data center 222 pass through load balancer 234. Load balancer 234 directs connection requests from WAN optimization devices 208-210 to WAN optimization devices 224-226 in a manner that ensures that WAN optimization devices 224-226 are used efficiently.

In some embodiments, each WAN optimization device is associated with a capacity which is indicative of the amount of load (e.g., network connections) that the WAN optimization device is designed to handle. In other embodiments, the capacity value is measured, i.e., the capacity value is modeled based on the actual number of connections that the WAN optimization device has handled over a given time period (further details of how the capacity of a WAN optimization device can be modeled are provided infra).

The capacity of a WAN optimization device can be specified at an arbitrarily level of granularity. For example, in some embodiments, the capacity of a WAN optimization device can be provided on a per WAN optimization device basis, i.e., each WAN optimization device is associated with as single capacity that is indicative of the number of connections that the WAN optimization device can handle. In other embodiments, capacities can be specified on a per-application basis, i.e., each WAN optimization device is associated with multiple capacity values, wherein each capacity value is indicative of the number of connections of a particular application that the WAN optimization device is capable of handling. The load balancer can balance the load between the local WAN optimization devices at the granularity of the capacities, i.e., either at the per WAN optimization device level if the capacities are specified at the WAN optimization device level, or at the per-application level if the capacities are specified at the application level.

For ease of discourse the following discussion assumes that the capacities are specified at the per WAN optimization device level. It will be apparent to those having ordinary skill in the art that the techniques and systems described in this disclosure can be readily applied (i.e., without performing any experimentation) to situations where the capacities are specified at a different level of granularity (e.g., when the capacities are specified on a per-application basis).

Process for Load Balancing Between Multiple WAN Optimization Devices

Figure 3:
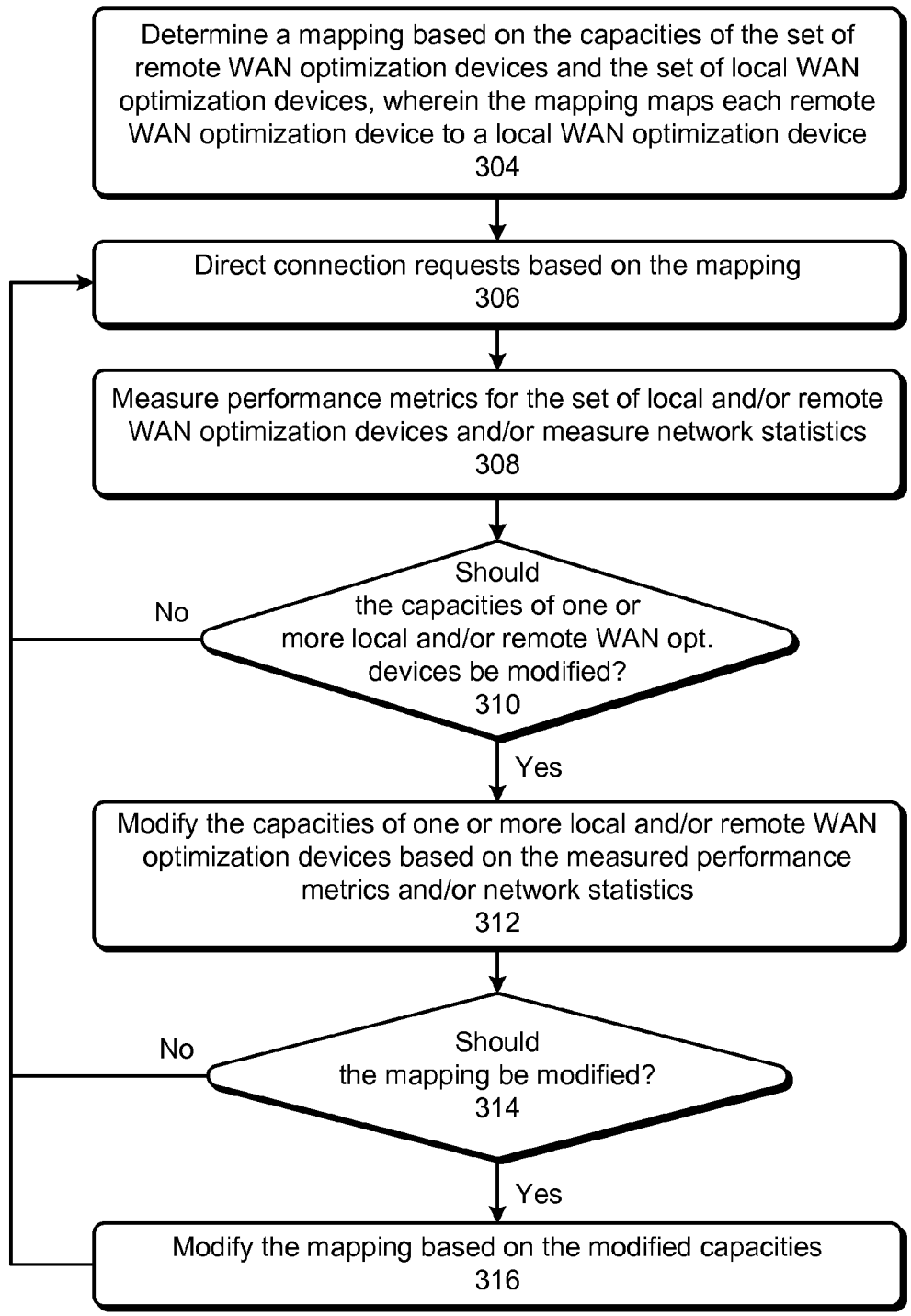
FIG. 3 illustrates a process for load balancing between multiple WAN optimization devices in accordance with some embodiments described herein.

FIG. 3 illustrates a process for load balancing between multiple WAN optimization devices in accordance with some embodiments described herein. The process shown in FIG. 3 can be performed by a load balancer (e.g., load balancer 234 shown in FIG. 2).

The process starts by determining a mapping based on the capacities of the set of remote WAN optimization devices and the set of local WAN optimization devices, wherein the mapping maps each remote WAN optimization device to a local WAN optimization device (operation 304). Some examples of how the load balancer determines a mapping are explained below in reference to FIGS. 4A-4C.

In some embodiments, the mapping process is an online process, i.e., the complete set of remote WAN optimization devices and their capacities are not known when the process starts. In some embodiments, the remote WAN optimization devices and their capacities are discovered as and when connection requests are received. Likewise, the set of local WAN optimization devices can also change as existing WAN optimization devices are removed from the set and/or new WAN optimization devices are added to the set. The terms "set of remote WAN optimization devices" and "set of local WAN optimization devices" used in operation 304 refer to the currently known or discovered WAN optimization devices.

The load balancer can use other information in addition to the capacities to determine the mapping (recall that, in this disclosure, the phrase "based on" means "based solely or partially on"). For example, the load balancer can determine the mapping by additionally using the amount of state information that is shared between pairs of remote and local WAN optimization devices (e.g., the mapping that maximizes the amount of state information that is shared between WAN optimization devices may be preferred), the current load on the local WAN optimization devices, and/or any other factor that is helpful in balancing the load across multiple WAN optimization devices.

The load balancer can then direct connection requests based on the mapping (operation 306). Specifically, the load balancer can direct connection requests from the set of remote WAN optimization devices to the set of local WAN optimization devices, and vice versa (i.e., connection requests from the set of local WAN optimization devices to the set of remote WAN optimization devices), based on the mapping.

Additionally, the load balancer can direct connection requests from local computers to the set of local WAN optimization devices based on the mapping. For example, suppose load balancer 234 intercepts a connection request from server 230 to client 202 shown in FIG. 2. The load balancer can direct the intercepted connection request to local WAN optimization device 224 based on the following information: (1) connections to client 202 pass through remote WAN optimization device 208 (load balancer 234 can determine this fact by analyzing connection patterns between clients and servers), and (2) the mapping maps remote WAN optimization device 208 to local WAN optimization device 224.

The load balancer can intercept and direct the connection requests transparently, e.g., the WAN optimization devices communicate with each other substantially in the same way they would have if there was no load balancer in the path between the pair of WAN optimization devices.

In some embodiments, the process shown in FIG. 3 completes after operation 306. For example, in these embodiments, the load balancer may continue to direct connection requests in accordance with the mapping until one or more of the following events occur: (1) a user manually changes the mapping, (2) the user manually triggers the load balancer to re-compute the mapping, and/or (3) the set of remote WAN optimization devices or the set of local WAN optimization devices changes (e.g., because a new WAN optimization device was added to the set of remote/local WAN optimization devices or an existing WAN optimization device timed out and was removed from the set of remote/local WAN optimization devices).

In some embodiments, the process does not complete at operation 306, and the mapping is automatically updated based on continually measuring the load on the local and/or remote WAN optimization devices and/or measuring network statistics that indicate a change in the capacity of the remote WAN optimization devices. Specifically, if the load on a local WAN optimization device is greater than a threshold, the load balancer can artificially decrease the capacity of the overloaded local WAN optimization device. Decreasing the capacity of the local WAN optimization device can cause the load balancer to re-compute the mapping so that potentially a different set of remote WAN optimization devices are mapped to the overloaded local WAN optimization device. The number of connections that are directed to the local WAN optimization device based on the modified mapping is expected to be less than the number of connections that are currently being directed to the local WAN optimization device, thereby reducing the load on the local WAN optimization device.

Likewise, if the measured load (e.g., based on network statistics) from a remote WAN optimization device is lower than the current capacity value of the remote WAN optimization device, the load balancer can artificially decrease the capacity of the remote WAN optimization device, and modify the mapping (e.g., by re-computing the mapping) so that the modified mapping better matches the estimated capacity (based on the network statistics) of the remote WAN optimization device.

After the load balancer shifts traffic away from an overloaded local WAN optimization device, the load on the local WAN optimization device may decrease, and this decrease will be reflected in the performance metrics that are being continually measured by the local WAN optimization devices. Once the load balancer detects that the performance metrics of the overloaded local WAN optimization device have returned to acceptable levels, the load balancer can increase (suddenly in a single increment or gradually in multiple increments) the capacity of the local WAN optimization device. Increasing the capacity can cause the load balancer to re-compute the mapping so that a potentially different set of remote WAN optimization devices are mapped to the local WAN optimization device. The number of connections that are directed to the local WAN optimization device based on the modified mapping is expected to be more than the number of connections that are currently being directed to the local WAN optimization device, thereby increasing the load on the local WAN optimization device.

Operations 308-316 shown in FIG. 3 illustrate a process for automatically modifying the mapping based on continually measuring the load on the local and/or remote WAN optimization devices and/or measuring network statistics that indicate a change in the capacity of the remote WAN optimization devices. Some examples of how the load balancer determines a mapping are explained below in reference to FIGS. 5A-5C. In some embodiments, performance metrics for the set of local and/or remote WAN optimization devices and/or network statistics can be measured (operation 308). For example, each local WAN optimization device can keep track of the processor utilization, memory utilization, disk activity, operating temperature, request processing latency, and/or any other performance metric that indicates the amount of load on the WAN optimization device. Additionally, the local WAN optimization devices can also keep track of the number of connections that are being received from the different remote WAN optimization devices.

Next, the local WAN optimization devices can provide the measured performance metrics and/or network statistics to the load balancer. For example, the local WAN optimization devices can provide this information (1) periodically, (2) when one or more performance metrics and/or network statistics change by a significant amount, and/or (3) in response to an explicit request from the load balancer. Based on the measured performance metrics and/or network statistics, the load balancer can determine whether or not the capacities of one or more local and/or remote WAN optimization devices should be modified (operation 310).

The load balancer may use a mathematical and/or logical expression to determine whether or not to artificially modify the capacity of a local and/or remote WAN optimization device. For example, in some embodiments, the load balancer may compare one or more performance metrics with a corresponding threshold (e.g., a 70% threshold for processor utilization, an 80% threshold for memory utilization, a temperature threshold of 90° F., etc.), and if any of the thresholds is exceeded, the load balancer may determine that the capacity of the local WAN optimization device needs to be modified. In another embodiment, the load balancer can use a mathematical expression (e.g., a weighted average of the processor and memory utilization) to determine a combined load value, and then compare the combined load value with a threshold to determine whether or not the capacities of one or more local WAN optimization devices need to be modified.

If the load balancer decides not to modify the capacities (the "No" branch), then the process returns to operation 306, and the load balancer continues to direct connection requests according to the existing mapping. On the other hand, if the load balancer decides that the capacities of one or more local WAN optimization devices should be modified (the "Yes" branch), then the load balancer modifies the capacities of the one or more local and/or remote WAN optimization devices based on the measured performance metrics and/or network statistics (operation 312).

The capacity of a WAN optimization device can be modified using many techniques. For example, the load balancer may decrease or increase the capacity of an overloaded WAN optimization device by a fixed amount or by a fixed percentage of the current capacity. In other embodiments, the load balancer may decrease or increase the capacity of a WAN optimization device based on the current load on the WAN optimization device. For example, the load balancer may use a function that is defined over one or more performance metrics to determine the amount by which the capacity of a WAN optimization device is to be decreased or increased (e.g., the load balancer may artificially decrease the capacity of a WAN optimization device more aggressively if the performance metrics indicate that the WAN optimization device is heavily loaded). The capacities of remote WAN optimization devices can be modeled based on the network statistics (further details of the modeling process are explained infra).

Once the capacities of the local and/or remote WAN optimization devices have been modified, the load balancer may decide whether or not to modify the mapping (operation 314). Operation 314 is optional, i.e., in some embodiments, the process may directly proceed from operation 312 to operation 316. In operation 314, the load balancer may determine a cost value and a benefit value associated with modifying the mapping. The cost value can represent, inter alia, the temporary reduction in network optimization that may occur when the mapping is modified (e.g., the cost value may represent the loss in the shared state information between WAN optimization devices, or the temporary increase in the network bandwidth due to the temporary loss in network optimization). The benefit value can represent, inter alia, the benefit that results from a more even distribution of the load between the local WAN optimization devices (e.g., the benefit value may represent the increase in overall performance of a set of local WAN optimization devices). If the cost value is greater than the benefit value, the load balancer may decide not to modify the mapping. On the other hand, if the benefit value is greater than the cost value, then the load balancer may decide to modify the mapping.

If the load balancer decides not to modify the mapping ("No" branch), then the load balancer returns to operation 306. On the other hand, if the load balancer decides to modify the mapping ("Yes" branch), then the load balancer can modify the mapping (operation 316), and then return to operation 306. In operation 306, the load balancer uses the current mapping (i.e., the unmodified mapping if the "No" branch was taken in operation 314, or the modified mapping if the "Yes" branch was taking in operation 314) to direct future connection requests from the set of remote WAN optimization devices to the set of local WAN optimization devices.

In some embodiments, operation 316 can use the same technique for determining the mapping as the one that was used in operation 304. In other words, operation 316 can determine a new mapping based on the updated capacities of the remote WAN optimization devices. In other embodiments, operation 316 can use a different technique for determining the mapping than the one that was used in operation 304. Specifically, in addition to distributing the load more evenly among the WAN optimization devices, the technique used in operation 316 can also try to minimize the amount of changes that are made to the current mapping.

In some embodiments, the network can include multiple load balancers. In these embodiments, one of the load balancers can be selected to be a master load balancer. The master load balancer determines the mapping from the set of remote WAN optimization devices to the set of local WAN optimization devices, and provides the mapping to the other load balancers. This ensures that all load balancers use the same mapping to direct connection requests. If the master load balancer dies, one of the other load balancers can become the master and take on the role of determining the mapping and distributing the mapping to the other load balancers.

Figure 4A:
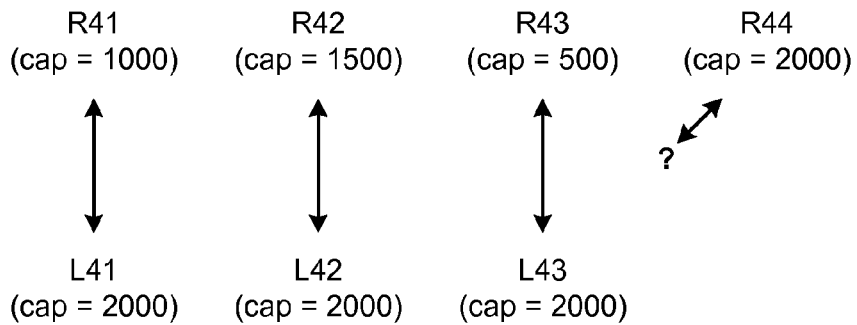
FIGS. 4A-4C illustrate an example of how load balancing between multiple WAN optimization devices can be performed in accordance with some embodiments described herein.
Figure 4B:
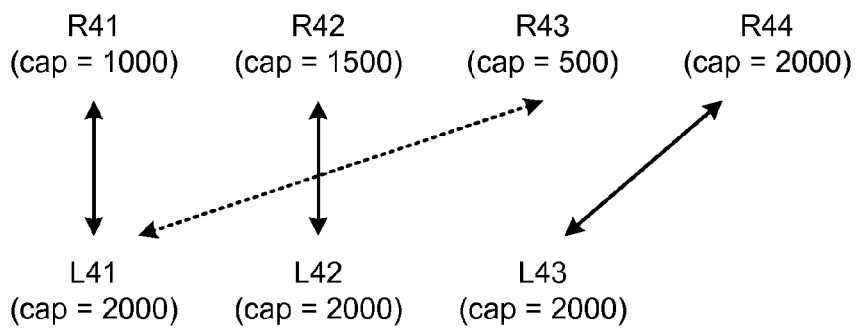
Figure 4C:
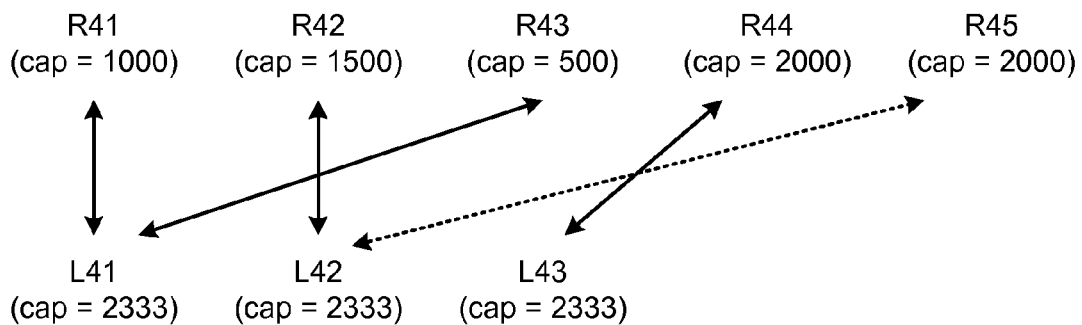

FIGS. 4A-4C illustrate an example of how load balancing between multiple WAN optimization devices can be performed in accordance with some embodiments described herein.

Remote WAN optimization devices R41-R44 and local WAN optimization devices L41-L43 can be part of an enterprise network. Connection requests from the remote WAN optimization devices to the local WAN optimization devices can pass through a load balancer (e.g., load balancer 234). The capacities of the WAN optimization devices are shown immediately below the WAN optimization devices. For example, the capacities of remote WAN optimization devices R41, R42, R43, and R44 are 1000, 1500, 500, and 2000, respectively. (Note that, if a WAN optimization device has a capacity of "1000," it does not necessarily mean that the WAN optimization device is capable of handling 1000 connections).

The load balancer can process connection requests received from the remote or local WAN optimization devices one at a time or in batches. (For example, the load balancer may use a short time window to collect connection requests, and then process the connection requests together as a batch. Batch processing can improve the quality of load balancing, but it can also increase the latency experienced by the end applications).

Regardless of whether the connection requests are processed one at a time or in a batch, the load balancer directs each connection request to a local WAN optimization device if the existing mapping maps the remote WAN optimization device to a local WAN optimization device. If the remote WAN optimization device has not been mapped to a local WAN optimization device, then the load balancer can select a local WAN optimization device, and map the remote WAN optimization device to the selected local WAN optimization device. The load balancer can then direct the connection request to the selected local WAN optimization device (and direct future connection requests received from the remote WAN optimization device to the selected local WAN optimization device).

For ease of discourse, this disclosure describes embodiments primarily in the context of receiving connection requests from remote WAN optimization devices. However, as explained at various places in this disclosure, the load balancer can perform load balancing in a bi-directional fashion, i.e., the load balancer can direct connection requests received from remote WAN optimization devices as well as local WAN optimization devices. Additionally, the load balancer can also direct a connection request received from a local computer to the appropriate local WAN optimization device. It will be apparent to those having ordinary skill in the art that the techniques and systems described in this disclosure can be readily applied (i.e., without any experimentation) to situations where the connection request is received from the local WAN optimization device or a local computer.

As shown in FIG. 4A, remote WAN optimization devices R41, R42, and R43 have been mapped to local WAN optimization devices L41, L42, and L43, respectively (note that the mapping is shown to be bi-directional to highlight the fact that the load balancer uses the mapping to direct connection requests in both directions). When a connection request from remote WAN optimization device R44 (with capacity 2000) is received, the load balancer can use the capacities of the remote and local WAN optimization devices to select an appropriate local WAN optimization device. For example, in some embodiments, the load balancer can try to minimize the maximum utilization across all local WAN optimization devices, wherein the utilization of a WAN optimization device is determined by dividing the aggregate capacity of the remote WAN optimization devices that are mapped to the local WAN optimization devices by the capacity of the local WAN optimization device. For example, in FIG. 4A, the utilizations of local WAN optimization devices L41, L42, and L43 are 1000/2000=0.5, 1500/2000=0.67, and 500/2000=0.25, respectively.

More formally, let the capacities of the remote WAN optimization devices be $C_i^r$, $1 \le i \le n$, and the capacities of the local WAN optimization devices be $C_m^l$, $1 \le j \le m$. Further, let M be a mapping that maps each remote WAN optimization device to a local WAN optimization device. Then the utilization U(j) of local WAN optimization device j can be determined using the following expression:

$$U(j) = \frac{\sum_{k \in M(j)} C_k^r}{C_j^l}, \qquad (1)$$

where M(j) is the set of indices corresponding to the remote WAN optimization devices that are mapped to local WAN optimization device j.

If remote WAN optimization device R44 is mapped to local WAN optimization device L41, then the utilization of local WAN optimization device L41 will become 3000/2000=1.5, which may violate the maximum utilization threshold of a WAN optimization device. Likewise, mapping remote WAN optimization device R44 to local WAN optimization devices L42 and L43 may also violate the maximum utilization thresholds. Therefore, upon receiving a connection request from remote WAN optimization device R44, the load balancer may decide to try to modify the mapping so that the connection request from remote WAN optimization device R44 can be accommodated without violating any maximum utilization thresholds.

FIG. 4B illustrates a possible mapping that the load balancer may determine to accommodate remote WAN optimization device R44. In the mapping shown in FIG. 4B, remote WAN optimization device R43 has been remapped to local WAN optimization device L41, and remote WAN optimization device R44 has been mapped to local WAN optimization device L43. Any existing connections between remote WAN optimization device R43 and local WAN optimization device L43 are maintained. However, any new connection requests that are received from remote WAN optimization device R43 are directed to local WAN optimization device L41 (instead of being directed to local WAN optimization device L43). The modification in the mapping is highlighted using a dotted arrow in FIG. 4B.

As shown in FIG. 4C, suppose a connection request from remote WAN optimization device R45 is received. Note that remote WAN optimization device R45 has not been mapped, and therefore a local WAN optimization device needs to be selected for mapping remote WAN optimization device R45. Mapping R45 to any of the local WAN optimization devices will cause the utilization to exceed the maximum utilization threshold. Furthermore, reshuffling the mapping will also not help, i.e., even after the mapping is reshuffled, the maximum utilization threshold will be exceeded.

In some embodiments, the load balancer artificially inflates the capacities of the local WAN optimization devices to accommodate situations where the aggregate remote WAN optimization device capacity is greater than the aggregate local WAN optimization device capacity. Specifically, the load balancer can determine a capacity ratio α using the following expression:

$$\alpha = \max\left(1, \frac{\sum_{i=1}^{n} C_i^r}{\sum_{j=1}^{m} C_j^l}\right). \quad (2)$$

Next, the load balancer can adjust the capacities of the local WAN optimization devices by multiplying the capacity of each local WAN optimization device by α. The adjusted capacities can then be used for determining the mapping. In the example shown in FIG. 4C, the sum of the capacities of the remote WAN optimization devices is equal to 7000, and the sum of the capacities of the local WAN optimization devices is equal to 6000. Therefore α=max(1, 7/6)=7/6, and the capacities of the local WAN optimization devices have been adjusted accordingly as shown in FIG. 4C (the capacities of the local WAN optimization devices have been rounded to the nearest integer).

The load balancer can use the adjusted capacities to determine a mapping. Specifically, based on the adjusted capacities of the local WAN optimization devices, the load balancer may decide to map remote WAN optimization device R45 to local WAN optimization device L42. Note that the resulting utilization of local WAN optimization device L42 is equal to 2500/2333=1.07 which, although it is greater than 1.0, may still be less than the maximum utilization threshold (in some embodiments, the maximum utilization threshold is configured so that the utilization of a WAN optimization device can go above 1.0 by a small amount, e.g., the maximum utilization threshold may be 1.15 in some embodiments). If the resulting utilization was greater than the maximum utilization threshold, the load balancer could have inflated the capacities of the local WAN optimization device even more. Note that the above-described technique of inflating the capacities of the local WAN optimization devices is optional. In other embodiments, the load balancer may keep the capacities of the local WAN optimization devices constant, and determine utilizations accordingly. In some embodiments, if the load balancer needs to inflate the capacities of local WAN optimization devices, then the load balancer may alert a network administrator that a network upgrade is due.

Figure 5A:
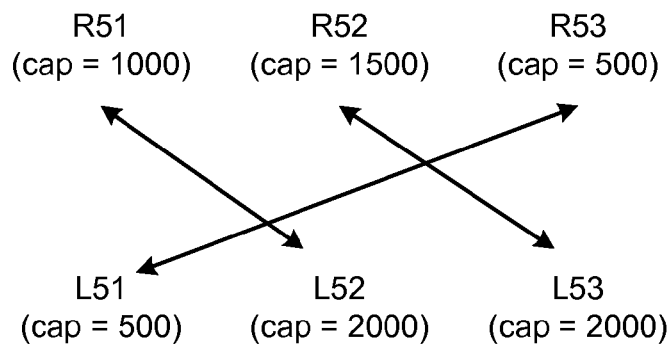
FIG. 5A-5C illustrate how capacities of local WAN optimization devices can be modified based on measured performance metrics in accordance with some embodiments described herein.
Figure 5B:
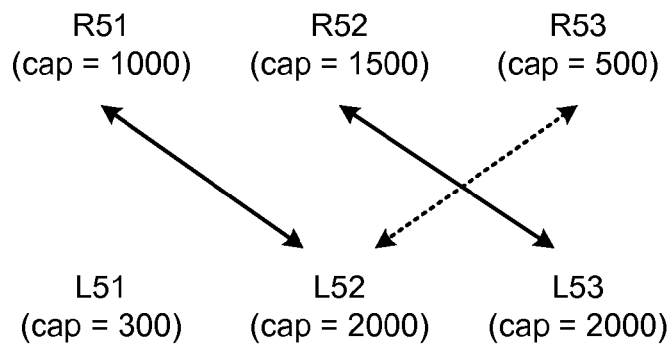
Figure 5C:
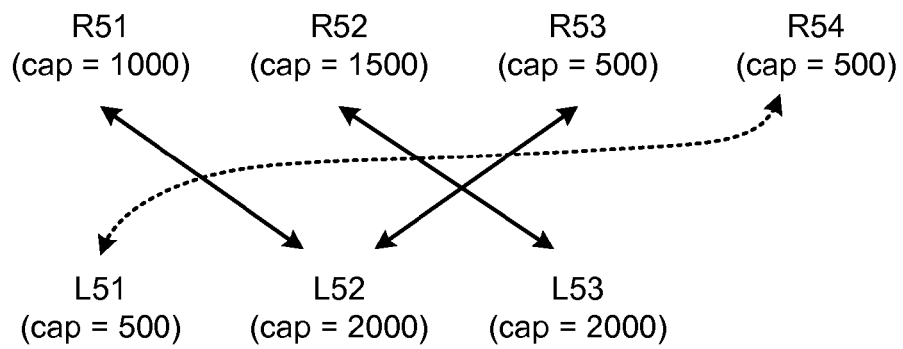

FIG. 5A-5C illustrate how capacities of local WAN optimization devices can be modified based on measured performance metrics in accordance with some embodiments described herein.

Remote WAN optimization devices R51-R53 and local WAN optimization devices L51-L53 can be part of an enterprise network. As shown in FIG. 5A, remote WAN optimization devices R51, R52, and R53 have been mapped to local WAN optimization devices L52, L53, and L51, respectively. The performance metrics received from local WAN optimization device L51 may indicate that local WAN optimization device L51 is overloaded. In response, the load balancer may artificially reduce the capacity of local WAN optimization device L51. This is illustrated in FIG. 5B, where the capacity of local WAN optimization device L51 has been reduced by 40% to 300. Next, the load balancer may decide to modify the mapping because based on the updated capacities, the utilization of local WAN optimization device L51 is equal to 500/300=1.67, which may violate the maximum utilization threshold. Therefore, the load balancer may determine a new mapping based on the updated capacities as shown in FIG. 5B. Specifically, remote WAN optimization device R53 is remapped to local WAN optimization device L52. Note that, after the remapping, the utilizations of the local WAN optimization devices are within the maximum utilization threshold.

Subsequently, the performance metrics of local WAN optimization device L51 may improve. When the load balancer receives performance metric data from local WAN optimization device L51 that indicates that the local WAN optimization device is no longer overloaded, the load balancer may decide to increase the capacity of local WAN optimization device L51 to 500 as shown in FIG. 5C. Next, a connection request from remote WAN optimization device R54 (capacity=500) may be received. Since local WAN optimization device L51 has reverted back to its original capacity of 500, the load balancer may map remote WAN optimization device R54 to local WAN optimization device L51 as shown in FIG. 5C.

In some embodiments, after the capacity of a local WAN optimization device is increased, the load balancer may trigger a remapping, which may again cause the local WAN optimization device to be overloaded. If the load balancer detects such map flapping, then, in some embodiments, the load balancer may permanently decrease the capacity of the local WAN optimization device. The capacity of the local WAN optimization device remains at the decreased level until it is manually increased by a network administrator.

Modeling the Capacity of a Remote WAN Optimization Device

In some embodiments, the load balancer can model the capacity of a remote WAN optimization device based on network statistics, e.g., based on the connection requests received from the remote WAN optimization device. Specifically, the local WAN optimization devices can collect network statistics, e.g., by keeping track of the connection requests received from the remote WAN optimization devices. The local WAN optimization devices can then provide the network statistics to the load balancer. The load balancer can then estimate the capacities of the remote WAN optimization devices based on the network statistics.

The capacity of a remote WAN optimization device can be modeled at the per WAN optimization device level or at a lower level of granularity. For example, in some embodiments, a remote WAN optimization device can be modeled using multiple capacities, wherein each capacity is indicative of an amount of connection requests of a given type (e.g., different types may correspond to different applications) that are expected to originate from the remote WAN optimization device.

The following description provides some examples of how the capacity of a remote WAN optimization device can be modeled. These examples are for illustration purposes only and are not intended to limit the embodiments to the forms disclosed. Accordingly, many modifications and variations will be apparent to those of ordinary skill in the art.

The number of connections that originate from a given remote WAN optimization device can be measured at regular intervals to create a time series. The time windows during which the number of connections is measured can be of equal lengths or of different lengths. Further, these time windows can be overlapping or non-overlapping. For example, the local WAN optimization device can keep track of the number of connections received from a given remote WAN optimization device every 10 seconds.

Once a time series of measurements is obtained for a remote WAN optimization device, a capacity value (which can also be a function of time) can be computed. In some embodiments, the capacity of a remote WAN optimization device at time t can be represented as a function of the values in the time series. For example, in some embodiments, the capacity of a remote WAN optimization device at time t can be represented as a weighted sum of a subset of values in the time series. The coefficients used for determining the weighted sum can also be a function of time. For example, in some embodiments, the capacity C(t) of a remote WAN optimization device at time t can be expressed as:

$$C(t) = \sum_{i=-N}^{M} w(i) \cdot d(i), \quad (3)$$

where w(i) is a weight, d(i) is a value in the time series, and i is an index used for identifying a particular value in the time series. Specifically, i=0 can correspond to the latest value in the time series before time t, i=-1, -2, -3, etc. can correspond to progressively earlier values in the time series, and i=1, 2, 3, etc. can correspond to progressively later values in the time series.

In some embodiments, the capacity of the remote WAN optimization device at time t is determined using an exponentially weighted moving average, which can be expressed as:

$$C(t) = \sum_{i=0}^{N} p^{-i} \cdot d(-i), \quad (4)$$

where p is a constant between 0 and 1.

In some embodiments, the capacity of a remote WAN optimization device at time t is equal to an average over a given time window, which can be expressed as:

$$C(t) = \frac{1}{N+1} \cdot \sum_{i=0}^{N} d(-i). \quad (5)$$

These expressions for modeling the capacity of a remote WAN optimization device have been presented only for purposes of illustration. They are not intended to be exhaustive or to limit the embodiments to the forms disclosed. Accordingly, many modifications and variations will be apparent to a person having ordinary skill in the art.

Load Balancing Apparatus

Figure 6:
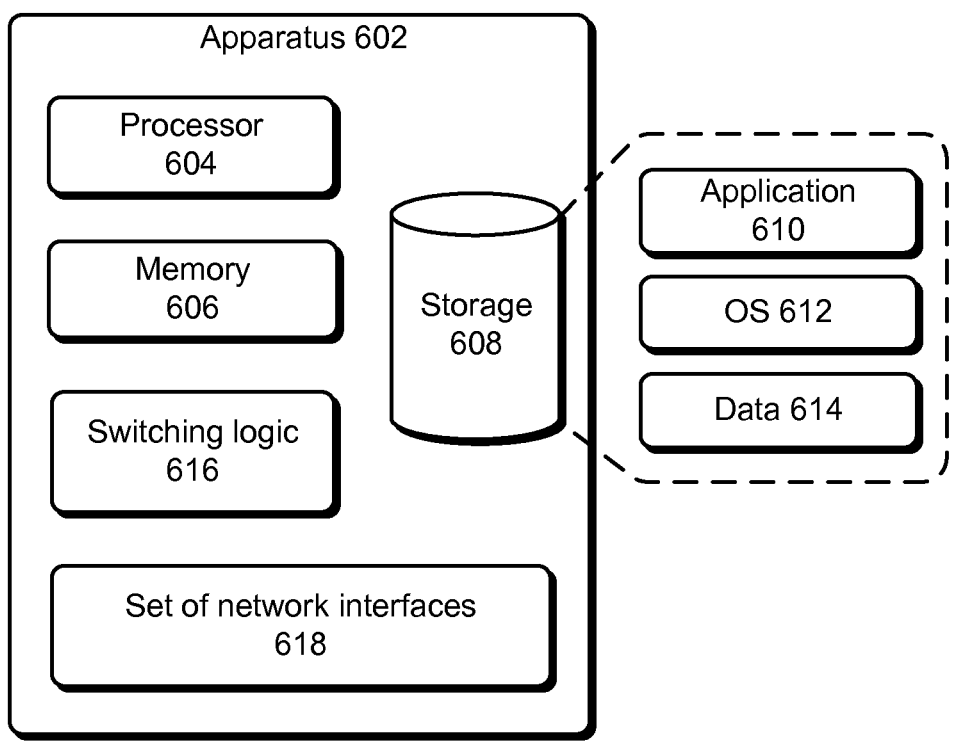
FIG. 6 illustrates an apparatus for load balancing in accordance with some embodiments described herein.

FIG. 6 illustrates an apparatus for load balancing in accordance with some embodiments described herein.

Apparatus 602 comprises processor 604, memory 606 (e.g., a volatile or non-volatile random access memory), and storage 608 (e.g., a flash memory device or a disk drive). Storage 708 can store application 610, operating system 612, and data 614. Apparatus 602 also includes switching logic 616 and set of network interfaces 618. The different components in apparatus 602 can communicate with one another using a communication mechanism, e.g., a bus, a backplane, and/or a switching fabric.

Application 610 can include instructions that, when executed by processor 604, cause apparatus 602 to perform one or more methods that are implicitly or explicitly described in this disclosure. Data 614 can include any data that is inputted into or outputted by application 610. Set of network interfaces 618 can be used to transmit data to and/or receive data from other communication devices. Switching logic 616 can direct connection requests (and possibly other network traffic) received from a remote WAN optimization device to the appropriate local WAN optimization device based on the mapping determined by application 610.

In some embodiments, application 610 can determine a mapping between local WAN optimization devices and remote WAN optimization devices. Next, application 610 can use the mapping to configure a redirection table that is used by switching logic 616. The term "redirection table" generally refers to a hardware and/or software mechanism that is used to redirect a connection request based on information contained in the connection request (e.g., layer-2 source/destination addresses, layer-3 source/destination addresses, TCP/UDP port numbers, and/or any other information contained in the connection request). When a connection request is received from a remote WAN optimization device, switching logic 616 can direct the connection request to a local WAN optimization device according to the redirection table.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for load balancing between WAN optimization devices, the method comprising:
   determining a mapping based on capacities of a set of remote WAN optimization devices and capacities of a set of local WAN optimization devices, wherein the mapping maps each remote WAN optimization device to a local WAN optimization device;
   directing connection requests from the set of remote WAN optimization devices to the set of local WAN optimization devices based on the mapping;
   measuring performance metrics for the set of local WAN optimization devices;
   modifying the capacities of one or more local WAN optimization device based on the measured performance metrics;
   modifying the mapping based on the modified capacities; and
   directing connection requests from the set of remote WAN optimization devices to the set of local WAN optimization devices based on the modified mapping.

2. The method of claim 1, further comprising directing connection requests from the set of local WAN optimization devices to the set of remote WAN optimization devices based on the mapping.

3. The method of claim 1, further comprising directing connection requests from local computers to the set of local WAN optimization devices based on the mapping and connection patterns between the local computers and remote computers.

4. The method of claim 1, wherein a capacity of a local WAN optimization device is indicative of an amount of connection requests that the local WAN optimization device is designed to handle.

5. The method of claim 1, wherein a capacity of a remote WAN optimization device is indicative of an amount of connection requests that are expected to originate from the remote WAN optimization device.

6. The method of claim 1, wherein a remote WAN optimization device is associated with multiple capacities, wherein each capacity is indicative of an amount of connection requests of a given type that are expected to originate from the remote WAN optimization device.

7. The method of claim 1, wherein each remote WAN optimization device's capacity is pre-configured on the remote WAN optimization device.

8. The method of claim 1, wherein a capacity of a remote WAN optimization device is determined based on an amount of connection requests received from the remote WAN optimization device.

9. The method of claim 1, wherein the method further comprises:
   directing connection requests from the set of local WAN optimization devices to the set of remote WAN optimization devices based on the modified mapping.

10. The method of claim 9, wherein modifying the capacities includes decreasing the capacity of a local WAN optimization device in response to determining that a utilization of the local WAN optimization device is above a threshold.

11. The method of claim 9, wherein modifying the capacities includes increasing the capacity of a local WAN optimization device in response to determining that a utilization of the local WAN optimization device is below a threshold.

12. An apparatus, comprising:
   a processor; and
   a non-transitory storage medium storing instructions that, when executed by the processor, cause the apparatus to perform a method for load balancing between WAN optimization devices, the method comprising:
      determining a mapping based on capacities of a set of remote WAN optimization devices and capacities of a set of local WAN optimization devices, wherein the mapping maps each remote WAN optimization device to a local WAN optimization device;
      directing connection requests from the set of remote WAN optimization devices to the set of local WAN optimization devices based on the mapping;
      measuring performance metrics for the set of local WAN optimization devices;
      modifying the capacities of one or more local WAN optimization device based on the measured performance metrics;
      modifying the mapping based on the modified capacities; and
      directing connection requests from the set of remote WAN optimization devices to the set of local WAN optimization devices based on the modified mapping.

13. The apparatus of claim 12, wherein the method further comprises directing connection requests from the set of local WAN optimization devices to the set of remote WAN optimization devices based on the mapping.

14. The apparatus of claim 12, wherein the method further comprises directing connection requests from local computers to the set of local WAN optimization devices based on the mapping and connection patterns between the local computers and remote computers.

15. The apparatus of claim 12, wherein a capacity of a local WAN optimization device is indicative of an amount of connection requests that the local WAN optimization device is designed to handle.

16. The apparatus of claim 12, wherein a capacity of a remote WAN optimization device is indicative of an amount of connection requests that are expected to originate from the remote WAN optimization device.

17. The apparatus of claim 12, wherein a remote WAN optimization device is associated with multiple capacities, wherein each capacity is indicative of an amount of connection requests of a given type that are expected to originate from the remote WAN optimization device.

18. The apparatus of claim 12, wherein each remote WAN optimization device's capacity is pre-configured on the remote WAN optimization device.

19. The apparatus of claim 12, wherein a capacity of a remote WAN optimization device is determined based on an amount of connection requests received from the remote WAN optimization device.

20. The apparatus of claim 12, wherein the method further comprises:
   directing connection requests from the set of local WAN optimization devices to the set of remote WAN optimization devices based on the modified mapping.

21. The apparatus of claim 20, wherein modifying the capacities includes decreasing the capacity of a local WAN optimization device in response to determining that a utilization of the local WAN optimization device is above a threshold.

22. The apparatus of claim 20, wherein modifying the capacities includes increasing the capacity of a local WAN optimization device in response to determining that a utilization of the local WAN optimization device is below a threshold.

23. A non-transitory computer readable storage medium storing instructions that, when executed by a processor in a load balancer, cause the load balancer to perform a method for load balancing between WAN optimization devices, the method comprising:
   determining a mapping based on capacities of a set of remote WAN optimization devices and capacities of a set of local WAN optimization devices, wherein the mapping maps each remote WAN optimization device to a local WAN optimization device;
   directing connection requests from the set of remote WAN optimization devices to the set of local WAN optimization devices based on the mapping;
   measuring performance metrics for the set of local WAN optimization devices;
   modifying the capacities of one or more local WAN optimization device based on the measured performance metrics;
   modifying the mapping based on the modified capacities; and
   directing connection requests from the set of remote WAN optimization devices to the set of local WAN optimization devices based on the modified mapping.

24. The non-transitory computer-readable storage medium of claim 23, wherein the method further comprises directing connection requests from the set of local WAN optimization devices to the set of remote WAN optimization devices based on the mapping.

25. The non-transitory computer-readable storage medium of claim 23, wherein the method further comprises directing connection requests from local computers to the set of local WAN optimization devices based on the mapping and connection patterns between the local computers and remote computers.

26. The non-transitory computer-readable storage medium of claim 23, wherein the method further comprises:
   directing connection requests from the set of local WAN optimization devices to the set of remote WAN optimization devices based on the modified mapping.

* * * * *